(12) United States Patent
Redding et al.

(10) Patent No.: US 11,796,419 B2
(45) Date of Patent: Oct. 24, 2023

(54) DISTRIBUTED BRILLOUIN LASER SENSOR

(71) Applicant: The Government of the United States of America, as represented by the Secretary of the Navy, Arlington, VA (US)

(72) Inventors: Brandon F. Redding, University Park, MD (US); Joseph B. Murray, Ellicott City, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 216 days.

(21) Appl. No.: 17/400,107

(22) Filed: Aug. 11, 2021

(65) Prior Publication Data

US 2022/0050012 A1  Feb. 17, 2022

Related U.S. Application Data (60) Provisional application No. 63/064,456, filed on Aug. 12, 2020.

(51) Int. Cl.
*G01M 11/00* (2006.01)
*H01S 3/08036* (2023.01)
*H01S 3/30* (2006.01)

(52) U.S. Cl.
CPC ..... *G01M 11/3109* (2013.01); *H01S 3/08036* (2013.01); *H01S 3/302* (2013.01)

(58) Field of Classification Search
CPC .......... G01M 11/3109; G01M 11/083; G01M 11/3127; H01S 3/08036; H01S 3/302;
(Continued)

(56) References Cited

U.S. PATENT DOCUMENTS

| 2003/0021306 A1* | 1/2003 | Fernald | H01S 3/0675 |
| | | | 372/20 |
| 2005/0025501 A1* | 2/2005 | Bickham | H04B 10/2537 |
| | | | 398/188 |

(Continued)

OTHER PUBLICATIONS

Shangguan et al., "Brillouin optical time domain reflectometry for fast detection of dynamic strain incorporating double-edge technique," Optics Communications, vol. 398, 2016, pp. 95-100.
(Continued)

*Primary Examiner* — Md M Rahman
(74) *Attorney, Agent, or Firm* — US Naval Research Laboratory; Suresh Koshy (57) ABSTRACT

Brillouin fiber sensors can provide distributed measurements of parameters of interest over long distances in a fiber by measuring the Brillouin frequency shift as a function of position along the fiber. The Brillouin frequency shift may be determined, to within a small fraction of the Brillouin linewidth, by establishing a series of lasing modes that experience Brillouin amplification at discrete spatial locations in a test fiber. A linewidth narrowing and high intensity associated with the lasing transition enable precise measurements of the lasing frequency associated with each of the lasing modes. The Brillouin frequency may be determined based on the lasing frequency.

16 Claims, 6 Drawing Sheets

(58) Field of Classification Search
CPC ...... H01S 3/0014; H01S 3/005; H01S 3/0085; H01S 3/06754; H01S 3/2383
USPC ........................................................ 356/73.1
See application file for complete search history.

(56) References Cited

U.S. PATENT DOCUMENTS

| | | | | |
|---|---|---|---|---|
| 2014/0023098 | A1* | 1/2014 | Clarkson | H01S 3/08 372/6 |
| 2017/0248448 | A1* | 8/2017 | Horiguchi | H01S 5/0085 |
| 2018/0073959 | A1* | 3/2018 | Lecoeuche | G01D 5/35361 |
| 2021/0148736 | A1* | 5/2021 | Lee | H01S 3/2375 |

OTHER PUBLICATIONS

Bai et al., "The Influence of Laser Linewidth on the Brillouin Shift Frequency Accuracy of BOTDR," Applied Sciences, 2018, 18 pages.

Luo et al., "Simple open-cavity pulsed Brillouin fber laser with broadband supercontinuum generation, " Applied Physics B Lasers and Optics, vol. 123, 2107, 5 pages.

Smith et al., "Narrow-linewidth stimulated Brillouin fiber laser and applications," Optics Letters, vol. 16, Issue 6, Mar. 15, 1991, pp. 393-395, 3 pages.

Loh et al., "Ultra-narrow linewidth Brillouin laser with nanokelvin temperature self-referencing: supplementary material," Optica, vol. 6, Issue 152, 2019, 3 pages.

Preußler et al., "Brillouin scattering gain bandwidth reduction down to 3.4MHz," Optics Express, vol. 19, Issue 9, 2011, pp. 8565-8570.

Motil et al., "[Invited] State of the art of Brillouin fiber-optic distributed sensing." Optics & Laser Technology, vol. 78, 2016, pp. 81-103.

Masoudi et al., "Contributed Review: Distributed optical fibre dynamic strain sensing," Review of Scientific Instruments, vol. 87, 2016, 10 pages.

Miller et al., "High-Performance Sensing Using Fiber Lasers," Optics & Photonics News, vol. 23, Issue 2, Feb. 2012, pp. 30-36, 7 pages.

\* cited by examiner

DISTRIBUTED BRILLOUIN LASER SENSOR

CROSS-REFERENCE TO RELATED APPLICATIONS

This application is a non-provisional of and claims the benefit of U.S. provisional application No. 63/064,456, filed on Aug. 12, 2020, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #113539-US2.

BACKGROUND

Brillouin fiber sensors enable fully distributed measurements of parameters of interest (e.g., strain and temperature) in optical fibers. Many Brillouin sensors also provide a large dynamic range and the ability to operate over long distances with high spatial resolution. These unique features make Brillouin sensors suited for a variety of structural health monitoring applications. However, Brillouin sensors struggle to achieve the same sensitivity as competing technologies such as fiber Bragg grating sensors. This limited sensitivity results from the need to measure the Brillouin frequency to within a small fraction of its linewidth.

While an array of Brillouin sensing modalities exist, they all rely on the same basic transduction mechanism, the measuring of the Brillouin frequency shift, which is a linear function of strain and temperature in the fiber. This is accomplished either by measuring stimulated Brillouin scattering (SBS), as in Brillouin optical time domain analysis (BOTDA), or by measuring spontaneous Brillouin scattering (SpBS), as in Brillouin optical time domain reflectometry (BOTDR). SBS based sensors operate by injecting counter propagating pump and probe beams into the test fiber and typically exhibit lower noise since the SBS process is more efficient. On the other hand, they require access to both ends of the fiber and the dynamic range is limited by the need to scan or track the relative frequency between the pump and probe beams. In contrast, SpBS based sensors enable single-ended operation by simply injecting pump light into the fiber and measuring the frequency of the spontaneous backscattered light. This approach enables a large dynamic range, but the weak spontaneous scattering process results in low light levels and extensive averaging is often required.

Over the past decade, a number of variations on these basic schemes have been introduced to improve the spatial resolution, dynamic range, linearity, signal-to-noise ratio (SNR), and crosstalk in these sensors. Despite these advances, all of these sensors have to contend with the intrinsically low responsivity of the Brillouin resonance to strain and temperature (~0.05 MHz/με and ~1 MHz/K). Although the Brillouin resonance is relatively narrow (~30 MHz in standard telecom fiber), detecting small changes in strain or temperature requires the sensor to measure the center of the Brillouin resonance to within a small fraction of its linewidth. For comparison, the resonance of a fiber Bragg grating (FBG) has a strain response on the order of 100 MHz/με. For example, a standard, commercially available FBG with a linewidth of 1 GHz, detecting 1 με would require the sensor to measure a shift in the resonance by 10% of the full width at half maximum (FWHM). In contrast, a Brillouin sensor would need to be sensitive to a shift in the Brillouin resonance as small as 0.17% of the FWHM to detect the same 1 με. Since most Brillouin sensors—whether they operate using SBS or SpBS—do not alter the intrinsic linewidth of the Brillouin resonance, high SNR is required to accurately estimate the center of the resonance. In practice, the situation is even more challenging in many time-domain modalities such as BOTDA, since short pulses effectively broaden the Brillouin linewidth. Even with a technique called gain spectrum, which combines a series of Stokes and anti-Stokes interactions to narrow the effective Brillouin resonance, yields a narrowest linewidth of approximately 3 MHz.

SUMMARY

A Brillouin-based sensing modality that may provide orders-of-magnitude improvement in sensitivity by accurately measuring the Brillouin frequency shift is described herein. This approach relies on establishing a lasing mode in which optical gain is provided by stimulated Brillouin scattering at a localized position in the fiber. In this case, lasing will occur at the frequency that experiences the most gain—that is, at the center of the Brillouin gain spectrum. Moreover, the lasing linewidth may be significantly narrower than the Brillouin gain spectrum, providing the potential to measure the center of the Brillouin gain spectrum with far more accuracy than existing Brillouin based sensors. A lasing linewidth of approximately 1 kHz (four orders of magnitude narrower than the gain spectrum) may be achieved, providing the potential for a dramatic improvement in sensitivity.

A system is described herein. The system includes a lasing cavity comprising a fiber under test and a feedback fiber that has a length that is based on a length of the fiber under test. The system may also include a pump generator configured to periodically pump the lasing cavity with a plurality of pump sequences, each pump sequence having a pump sequence period, to excite a plurality of lasing modes that are configured to be amplified by stimulated Brillouin scattering in the fiber under test, the pump sequence period being configured to match the round-trip time in the lasing cavity. A lasing frequency determiner may be included to sample each of the lasing modes and determine a lasing frequency as a function of time relative to each of the pump sequences, the lasing frequency occurring at a frequency with a highest gain to provide a measurement of a Brillouin frequency as a function of position in the fiber under test.

A method is also provided. The method includes periodically pumping a lasing cavity with a plurality of pump sequences, each pump sequence having a pump sequence period, to excite a plurality of lasing modes that are configured to be amplified by stimulated Brillouin scattering in a fiber under test, the lasing cavity comprising the fiber under test and a feedback fiber that has a length that is based on a length of the fiber under test, the pump sequence period being configured to match the round-trip time in the lasing cavity. The method further includes determining a lasing frequency by sampling each of the lasing modes, and determining the lasing frequency as a function of time relative to each of the pump sequences, the lasing frequency occurring at a frequency with a highest gain to provide a measurement of a Brillouin frequency as a function of position in the fiber under test.

Further features and advantages of the invention, as well as the structure and operation of various embodiments are described in detail below with reference to the accompanying drawings.

DETAILED DESCRIPTION

Definitions

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Over the past two decades, fiber optic sensors have become an increasingly popular tool for a wide range of sensing applications including perimeter security, structural health monitoring, and pipeline monitoring. Brillouin based fiber optic sensors are attractive due to their ability to achieve long-range, high spatial resolution, and large dynamic range in standard telecom fiber. In addition, Brillouin based sensors may measure the absolute strain, which may be crucial for applications such as structural health monitoring. However, these sensors offer only modest strain resolution and are often limited to static or quasi-static measurements.

On the other hand, state-of-the-art fiber laser sensors provide exceptional sensitivity and high bandwidth. These systems use fiber Bragg gratings to define a localized lasing cavity in a section of gain-doped optical fiber (e.g. Erbium doped fiber). The lasing cavities are typically designed as either distributed feedback cavities or distributed Bragg reflector based cavities. In both cases, the sensors operate by monitoring the lasing frequency, which depends on the strain and temperature in the fiber. The exceptional sensitivity of these devices is a result of the long interaction time during which the lasing mode builds up inside the cavity. However, fiber laser sensors cannot provide fully distributed measurements of the strain or temperature along an entire fiber: each laser cavity must be fabricated using a dedicated grating, and frequency multiplexing is typically required to integrate multiple fiber lasers along a single fiber. As a result, existing fiber laser sensors are best suited for applications where a few (typically <10) high performance point sensors are sufficient.

A distributed Brillouin laser sensor described herein provides the absolute strain sensitivity and fully distributed nature of a standard Brillouin sensor with the sensitivity enhancement of a fiber laser sensor. Rather than introduce fiber Bragg gratings to define the lasing cavity, a much larger ring cavity is created. In addition, SBS is used to provide gain for the lasing mode. In order to perform distributed measurements, a pulsed pump is introduced with a repetition rate matched to the round-trip time in the lasing cavity. This ensures that counter-propagating lasing modes will experience gain at a specific location in the fiber each round trip. The frequency of a given lasing mode is then determined by the Brillouin gain spectrum at the position where the mode experiences gain. A time-resolved measurement scheme may then be used to separate lasing modes that experience gain at different positions in the fiber—providing a distributed measurement of the Brillouin frequency shift. Finally, since these lasing modes recirculate in the cavity, they become extremely sensitive to changes in the local Brillouin gain spectrum.

The distributed Brillouin laser sensing technique described herein leverages the linewidth narrowing effect associated with the Brillouin lasing transition to perform precise measurements of the Brillouin resonance. The lasing modes exhibit a narrow linewidth (e.g., 1-4 kHz observed in initial experiments, four orders of magnitude narrower than the Brillouin gain spectrum). This approach also combines the high intensity and high SNR of SBS based approaches with the large dynamic range of SpBS schemes. Accordingly, the technique described herein yields a narrow linewidth for better sensitivity and high SNR due to the high light level. This technique does not require the time consuming frequency scanning process and a large dynamic range may be achieved. These features enable the realization of a sensor that simultaneously excites 40 lasing modes in a 400 m fiber, providing a measurement of the strain at 40 discrete locations with a special resolution of 4 m, in an embodiment. This embodiment achieves a minimum detectable strain as low as 4 nε/Hz$^{1/2}$ with a dynamic range of >5 mε and a bandwidth of ~10 kHz.

EXAMPLE EMBODIMENTS

A distributed Brillouin laser sensor may be designed to excite a series of temporally separated lasing modes that are amplified by SBS in a fiber under test (FUT) at distinct locations in the fiber.

Figure 1:
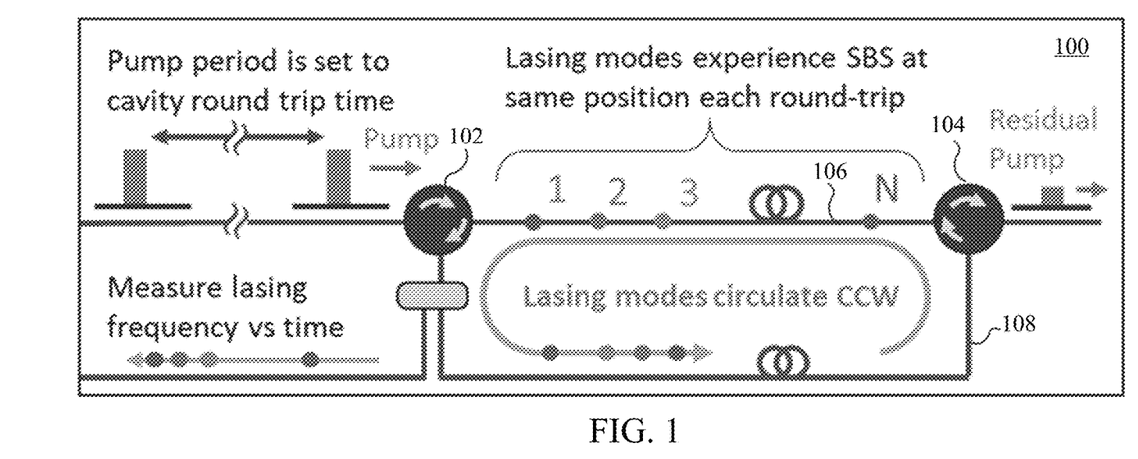
FIG. 1 depicts a schematic of a distributed Brillouin laser sensor, according to an example embodiment.

FIG. 1 depicts a schematic of a distributed Brillouin laser sensor system 100 having a few key components, a pump source for producing a pump, a pair of circulators 102 and 104, an interrogation system for sampling and determining lasing frequency versus time, and a ring cavity formed with FUT 106 and delay fiber 108. System 100 differs from a standard Brillouin fiber ring laser in that the pump may be coupled in and out of the ring cavity using circulators 102 and 104. This allows for non-resonant coupling, thus avoiding the need to lock the pump frequency to a cavity resonance. In addition, rather than using a continuous wave (CW) pump, the pump beam may be modulated into a series of pulses similar to a BOTDA or BOTDR measurement. This allows a time-resolved measurement to identify lasing modes that experience Brillouin amplification at different locations in the fiber.

When a pump pulse first enters FUT 106 via circulator 102, it generates spontaneous Brillouin scattered light traveling in a direction that is opposite from the direction of the pump (e.g., counter-clockwise (CCW)) through the ring cavity. This spontaneously scattered light experiences SBS at the same position after each round trip as it circulates through the ring cavity. When the SBS gain exceeds the round-trip loss in the cavity, the mode begins to lase. Above this threshold of the gain exceeding the loss, the lasing mode has a significantly narrower linewidth than the Brillouin gain spectrum (~30 MHz), enabling a more accurate measurement of the Brillouin frequency shift. The back scattered light may be injected into FUT 106 through circulator 104. The pump pulse period may be set to be equal to the round-trip time in the ring cavity to ensure that the spontaneous Brillouin scattered light or lasing mode experiences gain at the same position in the fiber each time it circulates through the ring cavity. By using this type of ring cavity geometry with pulsed operation, lasing naturally occurs at a frequency with the highest gain, providing a measurement of the Brillouin resonance at the position where a given mode experiences amplification. This is in contrast to CW Brillouin fiber lasers, which lase at the cavity resonance closest to the peak of the gain spectrum.

The architecture of system 100 allows the sensor to excite a series of N lasing modes that experience gain at N positions in the fiber connecting circulators 102 and 104. Although the lasing modes circulate in the same ring cavity, they are temporally separated and exhibit distinct lasing frequencies. After each round trip, a fraction (e.g., 1-10%) of each lasing mode may be removed from the ring cavity (e.g., using a fiber optic coupler) to measure the lasing frequency as a function of time to infer the Brillouin frequency as a function of position in FUT 106. The sampling and measuring of the lasing frequency may be performed by the interrogation system, which may include a pickoff coupler to sample the lasing modes. The pump pulse duration dictates the spatial resolution of system 100.

Figure 2:
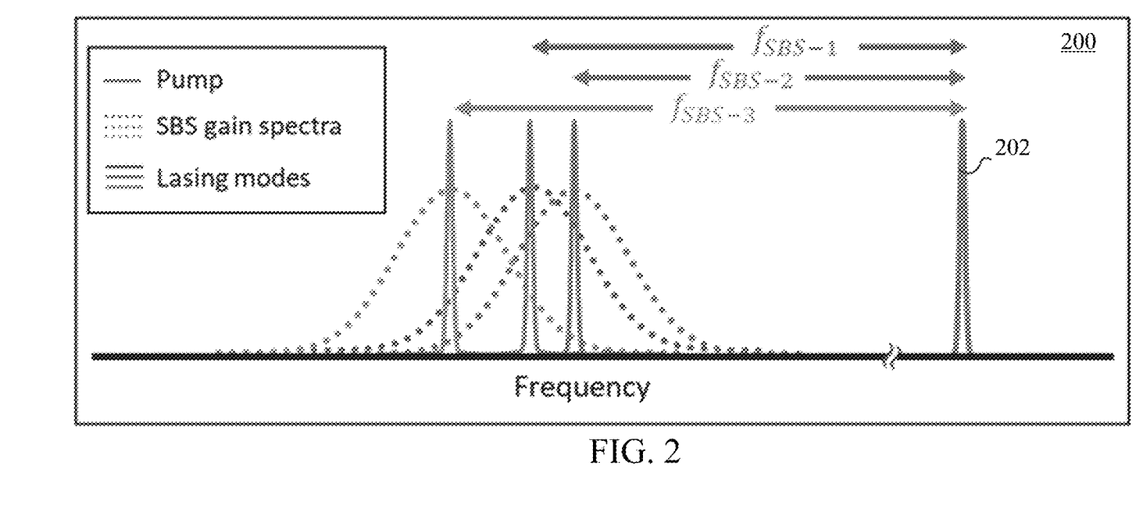
FIG. 2 depicts a diagram of relative frequencies of example lasing modes, their respective gain spectra and a pump frequency.

FIG. 2 depicts a diagram 200 of relative frequencies of example lasing modes, their respective gain spectra and a pump frequency. A pump pulse 200 may create a series of Brillouin gain spectra, shown as dotted lines in diagram 200, that are down-shifted from the Brillouin frequency at each position in the fiber. Narrowband lasing occurs at the peak of the gain spectrum at the position where a given mode experiences amplification. The lasing modes, shown as solid lines in diagram 200, are orders of magnitude narrower than the Brillouin gain spectra, thus enabling precise measurements of the Brillouin frequency. This scheme takes advantage of the linewidth narrowing and high intensity associated with the lasing transition to enable a precise measurement of the Brillouin frequency as a function of position in the fiber.

Figure 3:
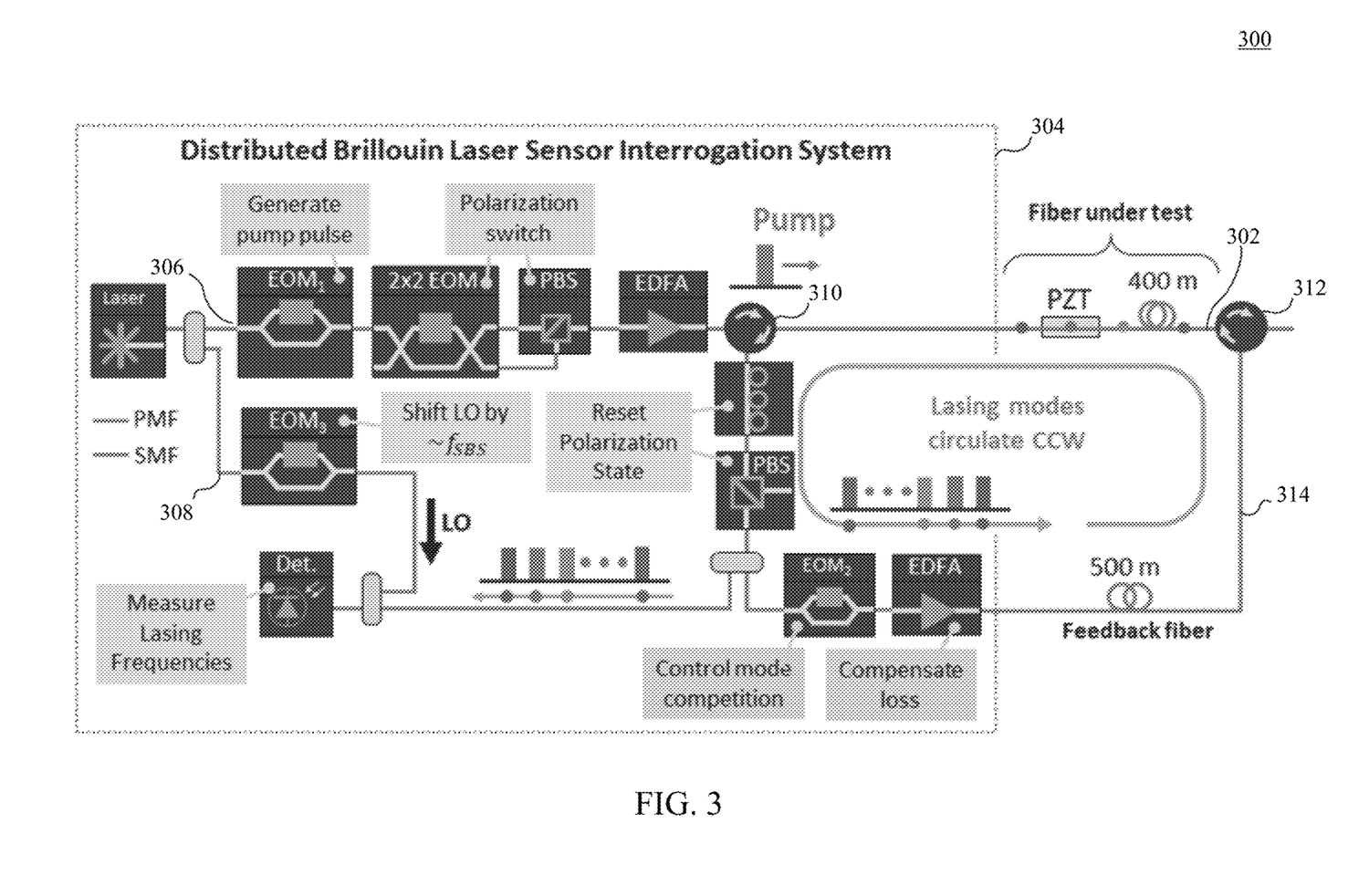
FIG. 3 depicts a system for realizing a distributed Brillouin laser sensor, according to an example embodiment.

System 100 may be implemented in various ways. For example, FIG. 3 depicts a system 300 for realizing a distributed Brillouin laser sensor, according to an example embodiment. System 300 differs from system 100 in that system 300 includes a scheme to compensate for polarization fading and polarization procession, allowing the sensor to use standard single-mode fiber as the FUT. System 300 also employs a technique to compensate for mode competition, enabling the sensor to excite a large number of lasing modes simultaneously. In embodiments, system 300 may include different and/or equivalent components or more or fewer components than shown in FIG. 3.

System 300 may include a lasing cavity connected to an interrogation system 304. In an embodiment, the lasing cavity may be a ring cavity that includes FUT 302 and feedback fiber 314. In an embodiment, FUT 302 includes 400 m of fiber with 10 m of fiber mounted on a linear PZT strain stage. In other embodiments, the length of FUT 302 may generally be 1 m or greater, depending on the specific application. Interrogation system 304 may have functional components, including an optical source to generate light to be injected into system 300. System 300 may further include a pump generator to generate a pump signal in various ways. In an embodiment, the pump signal includes periodic pump sequences, where each pump sequence has a predefined pump sequence period. For example, the pump generator may create multiple pulses as pump sequences with a pump pulse period as the pump sequence period. As another example, the pump generator may modulate a continuous pump to form pump sequences, each pump sequence having a predefined pump sequence period. A polarization switch or controller may be included in the ring cavity and/or in the pump path to address polarization fading or polarization state resetting. Amplifiers (e.g., broadband amplifiers) may be included to compensate for loss due to other system components and/or enabling the lasing threshold to be achieved without requiring excessive Brillouin gain. System 300 may further include a local oscillator to generate a local oscillator signal (LO) and a lasing frequency determiner. The lasing frequency determiner may be configured to sample each of the lasing modes and measure the lasing frequency as a function of time relative to each pump pulse. The lasing frequency naturally occurs at a frequency with a highest gain and provides a measurement of the Brillouin frequency as a function of position in FUT 302. While not shown in FIG. 3, system 300 may include a processing unit, a system-on-chip, etc., configured to run a routine (e.g., to maintain multimode lasing), determine a change in a parameter of interest (e.g., strain, temperature, etc.) based on the Brillouin frequency, and/or perform calculations or analyze data.

Various devices and/or subsystems may implement the functional components of system 300. For example, shown in FIG. 3 is a laser as an optical source. The modulators may include a first, second and third electro-optic modulator, $EOM_1$, $EOM_2$, $EOM_3$, respectively, for providing polarization, frequency, phase, and/or intensity modulation. A 2×2 EOM and a polarizing beam splitter (PBS) may be used to implement a polarization switch or controller. The amplifiers may be Erbium-doped fiber amplifiers (EDFA) or similar. The detector may include a photodetector, and the transducer may be a piezoelectric (PZT) transducer or similar. System 300 may further include a feedback fiber 314 that, in combination with FUT 302, forms a ring cavity. Feedback fiber 314 may be approximately equal to or longer than FUT 302. In the embodiment with FUT 302 having a length of 400 m, feedback fiber 314 may have a length of 500 m to provide the feedback required for lasing. In an embodiment, single mode fiber (SMF) may be used to implement FUT 302 and feedback fiber 314, as well as to connect the components directly connected to first circulator 310. Other components of interrogation system 304 may be connected to one another via polarization maintaining fiber (PMF). For example, a FUT may include 10 m of SMF-28e followed by 18 m of fiber wrapped on a PZT and 200 m of SMF-28 Ultra, and the feedback fiber may be 300 m long. In other embodiments, other types of fibers may be used, for example, to satisfy component requirements.

In operation, a narrow-band CW laser may be divided into two paths to generate the pump pulses and the LO. Along a pump path 306, $EOM_1$ may be used to generate a plurality of pump sequences with a predefined repetition period. For example, a train of pump pulses may be generated to excite a plurality of lasing modes that are configured to be amplified by stimulated Brillouin scattering (SBS) in FUT 302. The pump sequence period may be configured to match the round-trip time in the ring cavity. For example, 40 ns pump pulses with a repetition period of ~5 μs may be utilized for 400 m of FUT. The pump pulses may be directed to a polarization switch (e.g., a polarizing beam splitter and 2×2 EOM). The 2×2 EOM may direct alternating pulses to opposite ports of the PBS, generating sequential pump sequences (e.g., pump pulses) with orthogonal polarizations. This scheme may efficiently mitigate the effects of polarization fading. Due to the circulation of the light, averaging of the two polarization states occurs automatically (which is different from typical BOTDA systems). The pump pulses may be amplified to a peak power (e.g., ~100 mW) by an amplifier (e.g., EDFA) before being coupled into the ring cavity through a first circulator 310. While not shown in FIG. 3, a wide wavelength division multiplexing (WDM) filter (e.g., 100 GHz) may be included after one or more amplifiers (i.e., EDFAs shown in FIG. 3) to suppress amplified spontaneous emission (ASE).

FUT 302, the upper portion of the ring cavity, may include fiber of a certain length (e.g., 400 m). In operation, any particular location of FUT 302 may be subjected to changes, such as strain and temperature, and these changes may be detected using interrogation system 304. FIG. 3 shows a portion of FUT 302 (e.g., ~10 m) stretched across a linear PZT stage positioned a particular location (e.g., 20 m after first circulator 310) to simulate real world strain. A second circulator 312 may be used to remove the residual pump light from the ring. As shown in FIG. 1, the SBS process excites lasing modes travelling in the direction opposite of the pump (e.g., CCW). To suppress the effect of polarization procession, the lasing modes may be directed through a manual polarization controller and a PBS. The polarization controller may be configured to reset the polarization state to ensure that the polarization state of the lasing modes is fixed at the beginning of each round trip. A coupler (e.g., 90:10) may be used to direct a portion of the lasing modes to a detector where they may be combined with the LO. The portion may vary depending on a number of factors, such as the coupler used, the acceptable sensor noise level, or the gain in the ring cavity.

The remaining 90% of the lasing power may be directed to $EOM_2$, which is configured to control mode competition. Mode competition may limit the number of lasing modes excited in the cavity and preclude the system from performing a distributed measurement over the entire FUT. For example, if the lasing modes immediately after the circulator reach their lasing threshold first, they may deplete the pump and there may not be enough pump power remaining for later modes to reach their lasing threshold. Thus, if $EOM_2$ is driven with a constant transmission, there may be non-uniform lasing leading to mode competition and neighboring mode interference. A better option may be to drive $EOM_2$ with a ramped transmission, which provides for uniform lasing even if neighboring mode interference still exists, yielding a noisier lasing amplitude.

To mitigate mode competition, $EOM_2$ may be utilized to adjust the round-trip loss experienced by each mode. This allows compensation for mode competition (e.g., attenuating the modes at the beginning of the fiber that experience the highest gain) and enables multimode lasing. This compensation may be achieved by driving $EOM_2$ with a pulse train with variable amplitude. The pulse train period may be matched to the round trip time in the cavity and the individual pulses may have the same duration as the pump pulse. In this manner, lasing may be uniform with no modal interference. Using a pulse train rather than a continuously varying transmission function also allows a series of discrete lasing modes to be excited (i.e., one mode per pulse). This helps to avoid interference between partially overlapping modes, which may obscure a measurement of the lasing frequency at a given position. As will be described below, pulsing $EOM_2$ also sets the minimum transform limited bandwidth of the lasing modes, which has implications for the sensor bandwidth.

In an embodiment, $EOM_2$ may be driven with a train of 40 pulses separated by 100 ns. The individual pulses may be 40 ns in duration (matched to the pump pulse duration for mode competition control purposes) providing a spatial resolution of 4 m, while the 100 ns pulse spacing provides a measurement of the Brillouin frequency in the FUT every 10 m. A simple numerical routine may be used to automatically adjust the transmission for each mode until 40 modes are lasing with comparable amplitude. This routine may require a few seconds to complete and may be limited by instrument latency, but may be adapted to periodically adjust the mode-dependent loss to maintain multimode lasing in a system such as system 300. For example, an automated routine may adjust the transmission through $EOM_2$ in order to establish multimode lasing with comparable mode amplitudes. The transmission for each mode may be set to be equal. A measurement containing a number of pulse trains (e.g., 20) may be recorded and an average amplitude of each lasing mode may be calculated. Next, any mode with an amplitude above or below a mean amplitude by a threshold (e.g., 25%) may be identified. A small (e.g., 1%) adjustment may be made to the transmission to the identified modes (i.e., the transmission may be increased for modes that are too weak and decreased for modes that are too strong). This routine may proceed iteratively until the amplitude of each lasing mode is within ±25% of the mean.

An amplifier (e.g., EDFA) may be included in the ring cavity to compensate for the insertion loss in $EOM_2$. This allows system 300 to reach the lasing threshold at modest levels of Brillouin gain. Note that a 100 GHz WDM filter may be included after the EDFA to suppress ASE. Since the EDFA gain spectrum is effectively flat across the 100 GHz WDM band, lasing may still occur at the Brillouin frequency. After the EDFA, the lasing modes may pass through feedback fiber 314 (e.g., 500 m of fiber) before being directed back into FUT 302 through circulator 312. By making the lower half of the ring cavity (i.e., feedback fiber 314) the same length or longer than FUT 302, the lasing modes are ensured to only interact with the pump pulse once per round trip. Thus, the first lasing pulse may be delayed in the lower half of the cavity for at least the time it takes for the pump pulse to traverse FUT 302. The inclusion of feedback fiber 314 is to ensure that a lasing mode may not experience gain at two positions in FUT 302, which could happen if FUT 302 is longer than the re-circulating path in the ring cavity.

In order to measure the lasing frequency, the lasing modes may be combined with a LO on a detector (e.g., 350 MHz or 600 MHz photodetector) and the interference signal may be digitized at 1 GS/s. The LO may be frequency shifted by driving $EOM_3$, with a 10.5 GHz tone while it is DC biased for carrier suppression. This creates a pair of sidebands at ±10.5 GHz, close to the ~10.6 GHz Brillouin frequency in FUT 302. This reduces the intermediate frequency between the lower sideband of the LO and the lasing modes to within the detector bandwidth, while the upper sideband of the LO produces a small DC offset in the detected signal.

Measurement time may be mapped to sensor position by using the same conversion as in standard BOTDA or BOTDR. The position of the interaction, $\Delta z$, is given by $\Delta z = (\Delta t - t_0) c / (2 n_{eff})$ where $\Delta t$ is time, $n_{eff}$ is the effective index of the fiber, and $t_0$ is the time it takes for the light to propagate from $\Delta z = 0$ to the detector.

Figure 4:
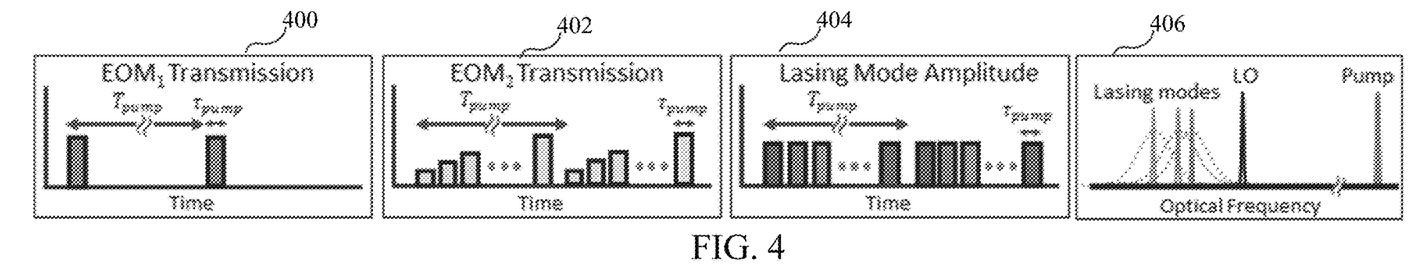
FIG. 4 depicts light transmission through modulators, lasing amplitudes in time domain, and relative frequencies of pump, local oscillator, and lasing modes, according to an example embodiment.

Some of the processes described above are depicted in plots of FIG. 4. FIG. 4 depicts light transmission through a couple of modulators ($EOM_1$ and $EOM_2$), lasing amplitudes in the time domain, and relative frequencies of pump, local oscillator, and lasing modes. For example, plot 400 depicts light transmission through $EOM_1$ as a pump pulse train having a period, $T_{pump}$, and a pump pulse duration, $\tau_{pump}$. Plot 402 shows a pulse train with gradually increasing amplitude, having the same pulse train period, $T_{pump}$, and pulse duration, $\tau_{pump}$. Thus, the pulse train shown in plot 402 has a pulse train period that is matched to the round trip time in the cavity and the individual pulses may have the same duration as the pump pulse. Note that the pulse train may be one in which each pulse may be varied and does not need to be monotonically increasing. In plot 404, lasing amplitudes in the time domain reaching the photodetector are depicted. In plot 406, the relative frequencies of the pump, LO, and lasing modes are shown.

Figure 5:
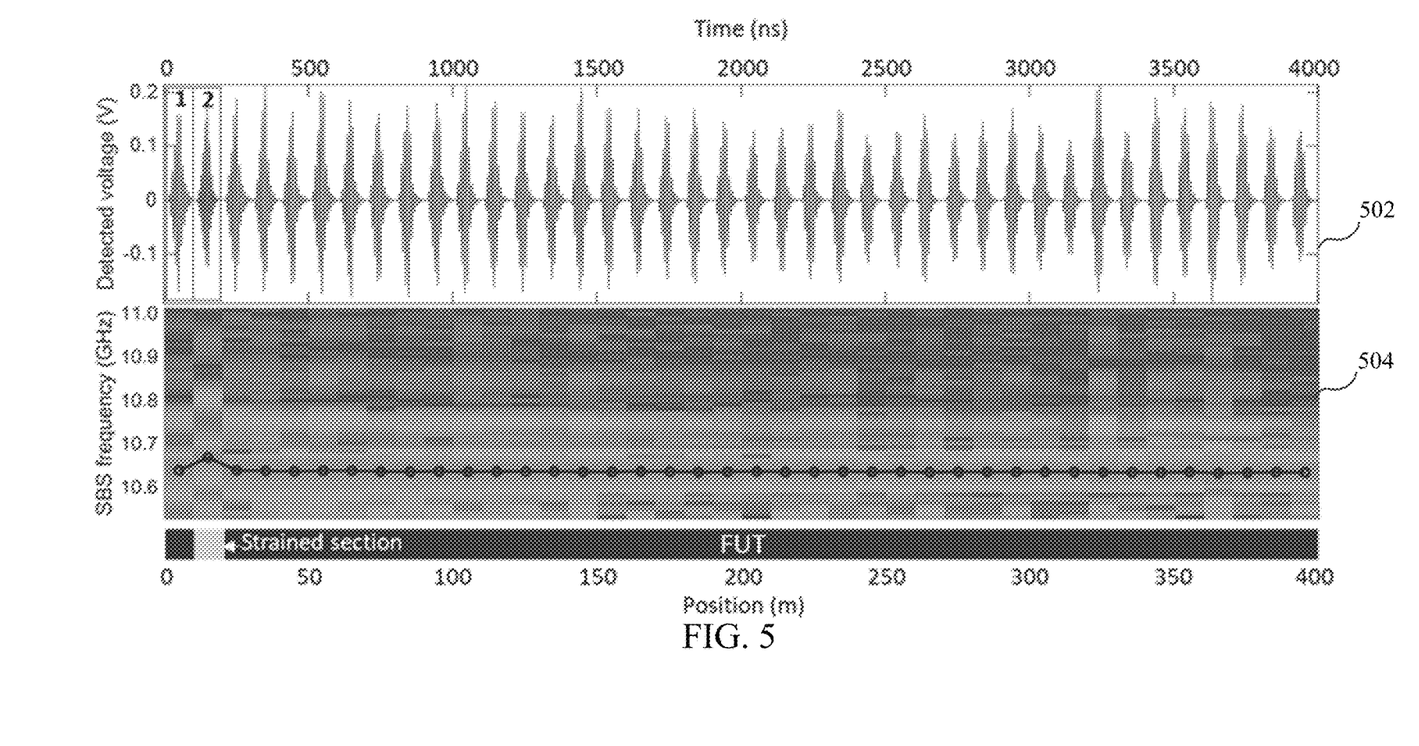
FIG. 5 depicts plots of a measured interference pattern produced by a local oscillator frequency mixing with a series of 40 lasing modes and a spectrogram showing the Fourier transform of each pulse.

FIG. 5 depicts plots of a measured interference pattern produced by a local oscillator frequency mixed with a series of 40 lasing modes and a spectrogram showing the Fourier transform of each pulse. Plot 502 shows 40 ns pump pulses injected into a FUT (400 m), providing 4 m spatial resolution, while the pulse train sent to $EOM_2$ is adjusted to obtain lasing with uniform amplitude across 40 modes separated by 100 ns (corresponding to 10 m spacing in the FUT). The linear strain stage located 20 m into the FUT may be used to shift the Brillouin resonance frequency. This location corresponds to the position where the second lasing mode experiences amplification. Plot 504 is a spectrogram of the Fourier transform of the interference signal, each 40 ns pulse shown in plot 502, as a coarse evaluation of the lasing frequency. The Brillouin frequency labelled on the y-axis of plot 504 may be obtained by adding the Fourier frequency to the frequency shift imposed on the LO. This spectrogram shows that the Brillouin frequency at the position where the second lasing mode experiences gain (i.e., on the PZT stage) is shifted by ~30 MHz with respect to the Brillouin frequency in the rest of the fiber. Note that this spectrogram, showing the Brillouin frequency at each position in the fiber, may be obtained from a single measurement of the lasing modes acquired in just 4 μs. The high intensity of the lasing mode allows the system to quickly characterize the Brillouin frequency throughout the FUT without requiring extensive averaging typical of conventional Brillouin sensing systems.

Figure 6:
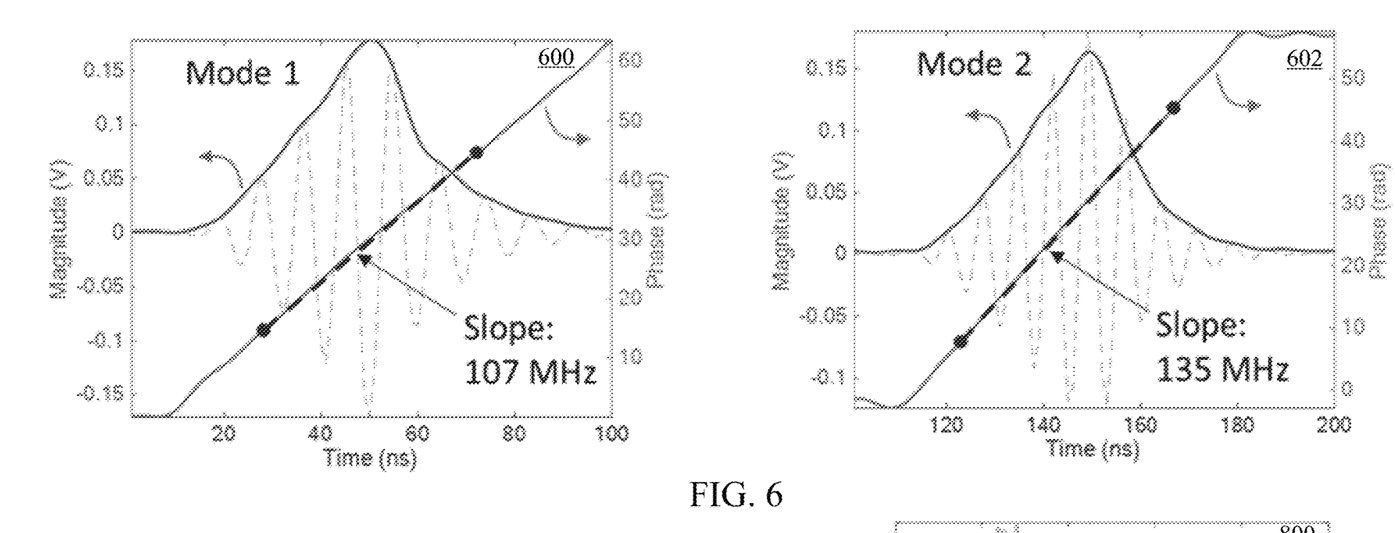
FIG. 6 depicts plots showing a change in Brillouin frequency at a sensor stage 20 meters into the fiber.

In order to accurately estimate the lasing frequency, I/Q demodulation may be used to extract the amplitude and phase of each mode from the interference pattern shown in FIG. 5 (plot 502). FIG. 6 depicts plots showing a change in Brillouin frequency at the PZT stage. The amplitude and phase for the first and second lasing modes are shown in plots 600 and 602, respectively. The slope of the phase provides a measurement of the intermediate frequency between the LO and the lasing mode and may be used to calculate the Brillouin frequency as $f_{SBS} = f_{EOM_3} + [d\phi/dt]/(2\pi)$ where $f_{EOM_3}$ is the 10.53 GHz frequency shift applied to the LO. Thus, the lasing frequency for each lasing mode may be determined as a function of time relative to each pump pulse from a sampling of a portion of each of the lasing mode. In an embodiment, I/Q demodulation may be performed in software in combination with hardware to obtain the frequency of the lasing modes. The nominal demodulation frequency for each mode may first be estimated by finding the peak of the Fourier transform of the interference signal. A Hann window may be used to select the mode of interest from each pulse train and recover the amplitude and phase of the lasing mode via standard I/Q demodulation using a finite impulse response low-pass filter. The slope of the phase may then fit via linear regression using the 40 ns with the largest amplitude (corresponding to the pulse duration). The lasing frequency may be estimated from the slope of the phase (plus the demodulation frequency) as discussed above, and changes in the lasing frequency may be converted to strain in the fiber assuming a standard response of 50 kHz/με.

This approach shows that the Brillouin frequency at the first sensor position is 10.637 ($f_{SBS} = 10.53$ GHz+$[0.107*2\pi]/(2\pi)$) GHz while the strain introduced by the PZT shifted the Brillouin frequency at the second sensor position by 28 MHz to 10.665 GHz ($f_{SBS} = 10.53$ GHz+$[0.135*2\pi]/(2\pi)$), using the equation above and 10.53 GHz for $f_{EOM_3}$. Changes in certain parameters (e.g., strain, temperature, pressure, etc.) in the FUT will cause shifts in the peak of the Brillouin gain spectrum. Thus, the Brillouin frequency is proportional to these parameters in the fiber. Accordingly, based on the Brillouin frequency, a change in parameter of interest (e.g., strain, temperature, pressure, etc.) may be determined.

Thus, the approach described herein enables single-shot measurements of the Brillouin frequency with a large dynamic range (limited only by the detector and digitizer bandwidth). The lasing phenomena may be used to leverage the linewidth narrowing effect to more accurately measure the Brillouin frequency. Due to the short temporal duration of the lasing pulses, their transform limited bandwidth remains relatively broad at 25 MHz for a 40 ns pulse. However, such a single-shot analysis neglects the pulse-to-pulse coherence, which makes the lasing modes resemble an optical frequency comb. To analyze the linewidth of the lasing modes, a technique commonly used to characterize frequency may be used. For example, a 5 ms dataset may be recorded, including 1000 measurements of the lasing pulse train interfering with the LO. A 100 ns Hanning window may then be applied to select the first lasing mode in each pulse train. Finally, the power spectral density (PSD) of the windowed interference signal over varying lengths of time may be calculated.

Figure 7:
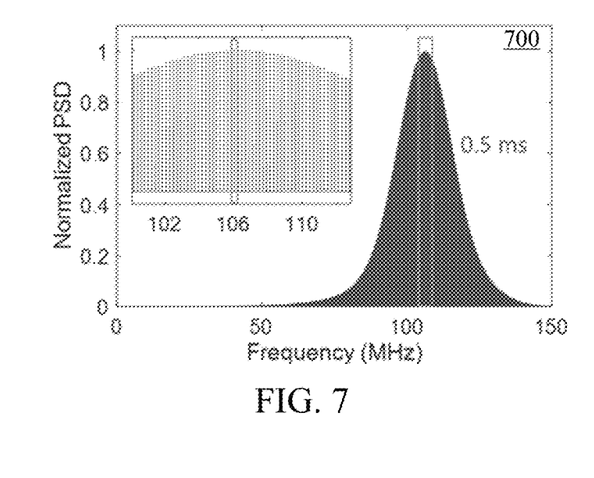
FIG. 7 depicts a power spectral density of an interference pattern produced by a lasing mode and a local oscillator signal.

FIG. 7 depicts a power spectral density of an interference pattern produced by a lasing mode and a local oscillator signal. FIG. 7 reveals a series of lines spaced by ~200 kHz (i.e., the pulse repetition period) characteristic of an optical frequency comb as shown in plot 702.

Figure 8:
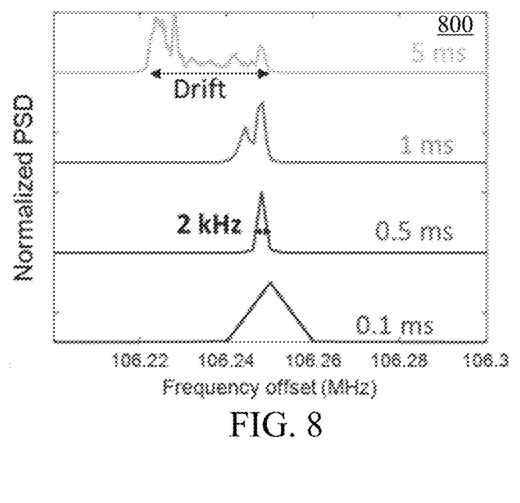
FIG. 8 depicts a width of an individual comb tooth shown for varying acquisition times.

FIG. 8 depicts a width of an individual comb tooth shown for varying acquisition times. As shown in FIG. 8, the minimum linewidth, obtained using a 0.5 ms integration time, is 2 kHz, which is four orders of magnitude narrower than the Brillouin linewidth. The linewidth broaden slightly in longer datasets, likely due to environmental drift in the relative phase between the LO and the lasing mode. Nonetheless, this dramatic linewidth reduction enables identification of the Brillouin resonance with unprecedented accuracy.

Figure 9:
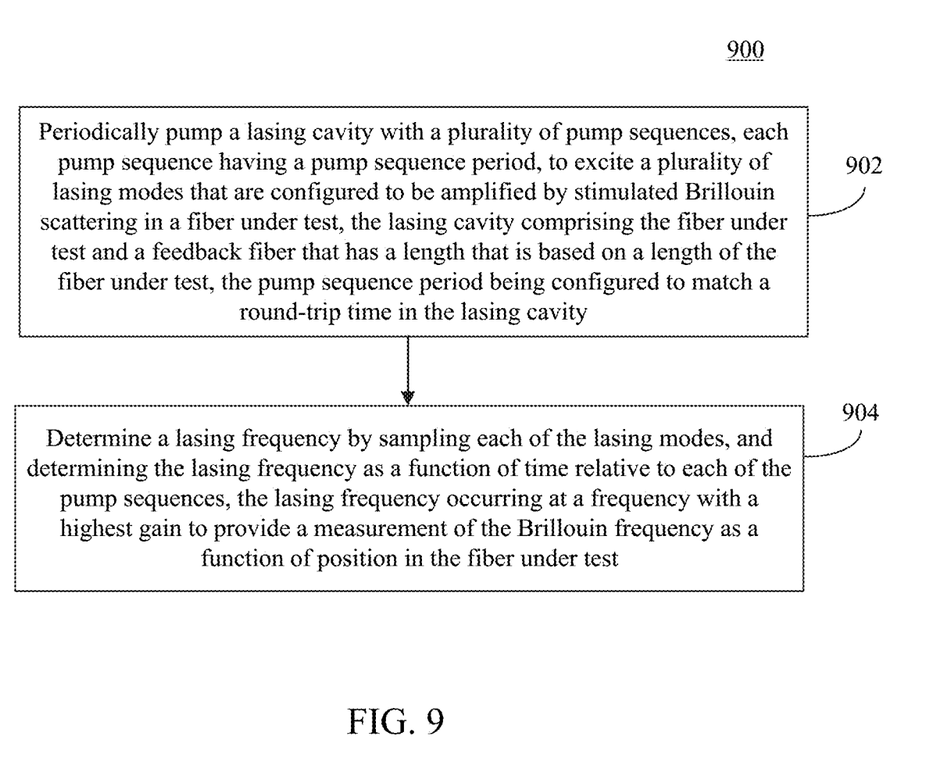
FIG. 9 is a flowchart for a method for distributed fiber sensing, according to an example embodiment.

FIG. 9 is a flowchart 900 for a method for distributed Brillouin fiber sensing, according to an example embodiment. For example, flowchart 900 may be performed by system 100 or system 300, shown in FIGS. 1 and 3, respectively. However, the method of flowchart 900 is not limited to those embodiments.

Flowchart 900 begins with step 902, in which a lasing cavity is periodically pumped with a plurality of pump sequences, each pump sequence having a pump sequence period, to excite a plurality of lasing modes that are configured to be amplified by stimulated Brillouin scattering in a fiber under test, the lasing cavity comprising the fiber under test and a feedback fiber that has a length that is based on a length of the fiber under test, the pump pulse period being configured to match the round-trip time in the lasing cavity. For example, a pump generator (e.g., $EOM_1$) may be configured to periodically pump the lasing cavity with a train of pumps to excite the lasing modes that may be amplified by stimulated Brillouin scattering in FUT 302 as shown in FIG. 3 and described above. As another example, the pump generator may be configured to modulate a continuous pump to generate a plurality of pump sequences, each pump sequence having a pump sequence period equal to the round trip period of the cavity.

In step 904, a lasing frequency may be determined by sampling each of the lasing modes, and determining the lasing frequency as a function of time relative to each of the pump sequences, the lasing frequency occurring at a frequency with a highest gain to provide a measurement of a Brillouin frequency as function of position in the fiber under test. For example, a lasing frequency determiner (e.g., photodetector shown in FIG. 3) may be configured to sample each of the lasing modes and determine a lasing frequency for each of the lasing mode as a function of time relative to each of the pump pulses. The lasing frequency may occur at a frequency with the highest gain to provide a measurement of a Brillouin frequency as a function of position in the fiber under test. Any suitable scheme for determining lasing frequency may be utilized, such as heterodyne detection (e.g., with a local oscillator), homodyne detection (e.g., measuring the frequency change accumulated during a give round trip), detection using an optical wavemeter, an optical spectrum analyzer, by servo control of the pump or probe frequencies, etc.

Flowchart 900 may include more or fewer steps than shown in FIG. 9. For example, flowchart 900 may include a step of determining a change in a parameter of interest based on the Brillouin frequency; mitigating mode competition with a pulse train that has a variable amplitude to adjust a round-trip loss experienced by each of the lasing modes; mitigating polarization fading with sequential pump sequences with orthogonal polarizations.

Additional Example Embodiments

Note that the general distributed Brillouin laser sensor scheme is agnostic to the method of frequency measurement. In embodiments, the lasing frequency may be measured using a variety of techniques, including: heterodyne detection (e.g. with a local oscillator) as described above, homodyne detection (e.g. measuring the frequency change accumulated during a given round trip), detection using an optical wavemeter, an optical spectrum analyzer, or by servo control of the pump or probe frequencies.

The monochromatic pump pulse depicted in FIG. 1 may be replaced by a variety pump modulation schemes in embodiments, including polarization, frequency, phase, and/or intensity modulation. This may also be combined with modification. These methods may be used to improve spatial resolution, to preferentially select for a lasing mode that experiences gain at specific locations, to mitigate mode competition, or to improve detection sensitivity.

While FIGS. 1 and 3 depict a ring-cavity configuration, other cavity designs that recirculate the lasing mode are also possible. For example, wavelength selective mirrors may be used to reflect the lasing mode back and forth, forming a Fabry-Pérot laser cavity.

The pump, which creates gain for the lasing mode via a Brillouin Stokes interaction, may also be combined with other pulses creating a Brillouin anti-Stokes interaction. Such a scheme may be used to "engineer" the Brillouin gain spectrum to induce a narrower response and more accurate measurement of the Brillouin frequency shift.

When considering the ability of the sensor to measure dynamic strain, two additional factors may influence the actual sensor bandwidth. The first factor is how quickly the lasing mode changes frequency when the Brillouin frequency changes. Consider the case in which a lasing mode is already established at the center of the Brillouin gain spectrum when the gain spectrum suddenly shifts due to strain in the fiber. Since the lasing mode is no longer centered at the peak of the gain spectrum, gain pulling will eventually shift the lasing frequency back to the center. However, the efficiency of the gain pulling effect depends on the instantaneous bandwidth of the lasing mode, since gain pulling relies on selectively amplifying the spectral components of the mode that overlap with the peak of the gain spectrum. As a result, shorter pulses may respond faster to a change in the Brillouin frequency due to their broader transform limited bandwidth. For example, in an embodiment, the 40 ns pulse duration set by $EOM_1$ and $EOM_2$ ensures that the lasing modes have a transform-limited bandwidth of ~25 MHz.

To evaluate the effective bandwidth of the sensor, the pump frequency may be modulated by inserting an acousto-optic modulator (AOM) before $EOM_1$. Modulating the pump frequency shifts the Brillouin gain spectrum relative to the lasing mode and thus the sensor response may be evaluated over a wide range of frequencies, including the frequencies beyond the PZT bandwidth. The pump frequency may be modulated, for example, with a deviation of 100 kHz at varying frequencies from 10 Hz to 50 kHz. Based on this modulation, the lasing mode may efficiently track the change in the pump frequency up to ~5 kHz. However, above ~5 kHz, the lasing frequency may struggle to keep up with the change in the pump frequency and the response may begin to fall off, resulting in a 3 dB reduction in responsivity at 10 kHz. While this bandwidth may be sufficient for most applications, a higher bandwidth may be possible using shorter pulses.

A monochromatic lasing mode may not respond to small changes in the gain spectrum. However, in operation, the lasing mode will always have a finite linewidth and gain pulling will eventually shift the mode back to the center of the gain spectrum. However, this process may be inefficient and may limit the response time of the Brillouin laser sensor. In a realistic system where the lasing mode is described by a Gaussian lineshape with mean frequency, $f_{lase,0}$, peak power, $P_0$, and linewidth, $\Gamma$ ($P_{lase}(\Delta f) = P_0 e^{(\Delta f - f_{lase,0})^2/\Gamma^2}$). If the Brillouin frequency suddenly changes, the number of round-trips, M, required for the peak of the lasing spectrum to match the new peak of the gain spectrum may be approximated as $$M \cong \frac{\ln(P_{lase}(0)/P_{lase}(f_{lase,0}))}{G_{SBS}(0) - G_{SBS}(f_{lase,0})} \quad (1)$$

where $P_{lase}(0)/P_{lase}(f_{lase,0})$ is the initial ratio of the lasing power at the new peak of the Brillouin gain spectrum to the maximum lasing power and the denominator describes the relative gain experienced at these two frequencies. As an example, a lasing mode with $\Gamma$=1.3 MHz may require M=1000 cycles to shift to the center of the gain spectrum after a sudden shift of 2 MHz at a typical gain of $e^{G_{SBS}(0)}$=2. Even assuming a high gain of $e^{G_{SBS}(0)}$=100, M=100 cycles may be required to track a shift of 2 MHz. This simple model indicates that the sensor bandwidth may be severely limited in the case of narrowband lasing.

The spectral content of the lasing mode may also be affected by the temporal modulation introduced by EOM$_2$ after each round trip. Since this time-domain modulation is equivalent to a convolution in the frequency domain, this process ensures that the laser spectrum is spread over a wide bandwidth. Thus a single round trip in the lasing cavity involves gain, loss, and convolution with the Fourier transform of the intensity modulation, $I(\Delta f)$. The lasing spectrum after the m$^{th}$ round trip may be described as follows.

$$P_{lase}(\Delta f, m) = \int [\alpha e^{G_{SBS}(\delta f)} P_{lase}(\delta f, m-1)] I(\Delta f - \delta f) d\delta f \quad (2)$$

The intensity modulation term essentially describes the redistribution of lasing power from the frequency $\delta f$ to $\Delta f$. This expression may be used to simulate the evolution of the lasing spectrum after a sudden shift in the Brillouin gain spectrum. The simulation may be repeated for lasing modes exposed to a Gaussian shaped temporal modulation with FWHM varying from 40 ns to 320 ns. In each case, the lasing frequency eventually converges to the center of the gain spectrum ($\Delta f$=0); however, the transition time is considerably faster for lasing modes that are modulated by shorter pulses. A mode modulated by 40 ns pulses has been found to return to within 10 kHz of the center of the gain spectrum after 15 round trips, while a mode modulated by 320 ns pulses requires 88 round trips. Thus, the intra-cavity modulation introduced by EOM$_2$ not only helps to control mode competition, but also increases the sensor bandwidth.

The second factor influencing the ability of the sensor to measure dynamic strains is the sensitivity to strain-induced Doppler shifts in the cavity itself, which can introduce crosstalk. If part of the FUT is exposed to a time-varying strain, any light passing through this section of fiber may experience a Doppler shift. This effect may introduce significant levels of crosstalk in standard Brillouin sensors (e.g., BOTDA) exposed to dynamic strain. With the approach described herein, the gain pulling effect may partially counteract this phenomenon by shifting the lasing frequency back toward the center of the Brillouin gain spectrum after each round trip. To compensate for this effect, it is possible to monitor any strain-induced Doppler shift experienced by each lasing mode using the frequency shift measured by the reference laser.

In an embodiment, a technique to compensate for a Doppler frequency shift created from dynamic strain may be employed. A reference interferometer may be added using a second laser, which may be coupled in and out of the FUT using a WDM filter connected to circulator 312. Using this reference interferometer, the time-varying phase accumulated through the 400 mf FUT may be recorded as $\phi_{ref}(t)$. The single-pass Doppler frequency shift experienced by light passing through the FUT may be calculated as $\Delta f_{ref}(t) = [d\phi_{ref}(t)/dt]/(2\pi)$. To correct for the impact of this Doppler shift on the lasing modes, the strength of the gain pulling effect on each mode may be measured. This may be accomplished by wrapping a short section of the FUT on a reference PZT and introducing a calibration signal (the reference PZT did not overlap with any of the sensor positions). The complex ratio, $\gamma_n$, between the frequency deviation observed for each lasing mode, $\Delta v_n(F_{PZT,ref})$, due to the reference PZT modulation, and the single-pass frequency deviation measured using the reference interferometer, $\Delta v_{ref}(F_{PZT,ref})$, may be calculated as follows.

$$\gamma_n = \frac{\Delta v_n(F_{PZT,ref})}{\Delta v_{ref}(F_{PZT,ref})} \quad (3)$$

$\Delta v_n$ is the Fourier transform of $\Delta f_n$, n enumerates the modes, and $F_{PZT,ref}$ is the frequency of the calibration tone. This ratio provides a scale factor, which accounts for the increased sensitivity to strain-induced Doppler shifts of the lasing modes. This scale factor varies slightly from mode to mode but may be ~3.5 with 40 ns pump pulses. To perform the correction, an analytic signal may be created using the Hilbert transform of the reference and lasing mode frequency shifts (to allow for a phase difference between the two signals). The corrected signal is given by:

$$\Delta f_{n,corrected} = H^{-1}\{H\{\Delta f_n\} - \gamma_{n,eff} H\{\Delta f_{ref}\}\} \quad (4)$$

where H{ } is the transform to the analytic signal and $H^{-1}$ { } is the inverse transform. This approach may add negligible noise to the measurements since the noise in the CW reference interferometer is much lower than the noise in the measured lasing modes. While this technique adds some complexity, it shows that cross talk due to strain-induced Doppler shifts is a tractable problem and may be sufficiently addressed.

In general, the distributed Brillouin laser sensor described herein has the potential to provide fully-distributed, absolute strain measurements with high sensitivity. In contrast, existing techniques do not provide all three of these features at once. The Brillouin laser sensor exhibits substantially lower strain noise than conventional Brillouin sensors at this length scale. Thus, the distributed Brillouin laser sensor described herein may be particularly useful for structural health monitoring (e.g., hull fatigue) or fiber optic shape sensing applications (e.g., hydrophone arrays) where distributed absolute strain measurements are required.

Example Computer System Implementation

Each of system 100, system 300 and/or their subsystems and flowchart 900 may be implemented in hardware, or hardware combined with software or firmware. For example, system 100, system 300 and/or their subsystems and flowchart 900 may be implemented as computer program code/instructions configured to be executed in one or more processors and stored in a computer readable storage medium. Alternatively, system 100, system 300 and/or their subsystems and flowchart 900 may be implemented as hardware logic/electrical circuitry.

The terms "computer program medium," "computer-readable medium," and "computer-readable storage medium" are used herein to refer to physical hardware media such as the hard disk associated with a storage device. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

In an embodiment, system 100, system 300 and/or their components may be implemented in a system-on-a-chip (SoC). The SoC may include an integrated circuit that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
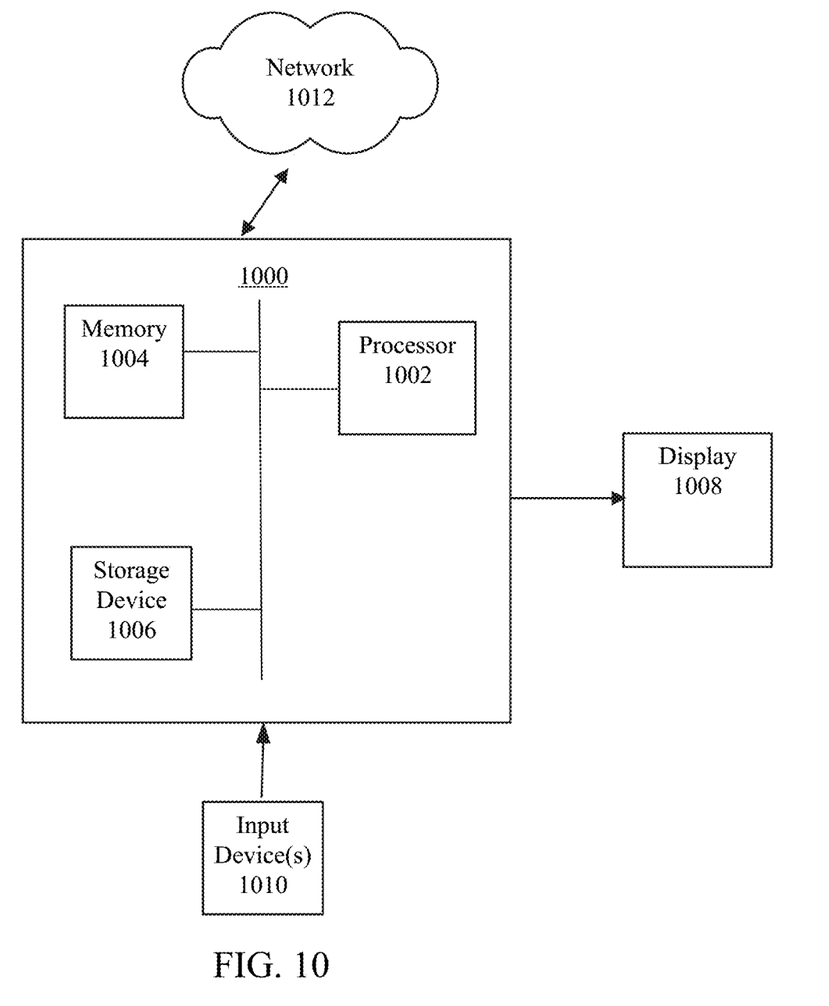
FIG. 10 is a block diagram of an example computer system in which embodiments may be implemented.

FIG. 10 is a block diagram of an example computer system in which embodiments may be implemented. The description of computing device 1000 is provided for purposes of illustration, and is not intended to be limiting. Embodiments may be implemented in further types of computer systems, as would be known to persons skilled in the relevant art(s).

As shown in FIG. 10, computing device 1000 includes processor 1002, memory 1004, and storage device 1006, and these components may be coupled together via a bus.

Processor 1002 may be referred to as a processor circuit or a processing unit. Processor 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor 1002 may execute program code stored in a computer readable medium, such as program code of an operating system, an application program, and other programs.

Memory 1004 includes any system memory, for example, read only memory (ROM) and random access memory (RAM) and may store a basic input/output system (e.g., BIOS).

Storage device 1006 may include any a hard disk drive, a magnetic disk drive, an optical disk drive, a removable optical disk (e.g., CD ROM, DVID ROM), a flash memory card, a digital video disk, RAMs, ROMs, or other hardware storage media. Storage device 1006 and its associated computer readable media provide nonvolatile storage of computer-readable instructions, data structures, program modules and other data for computing device 1000.

A number of program modules may be stored on memory 1004 and/or storage device 1006. These programs include an operating system, an application program, other programs, and program data. Such an application program or other programs may include, for example, computer program logic (e.g., computer program code or instructions) for implementing system components and/or embodiments described herein.

A user may enter commands and information into the computing device 1000 through input devices 1010 such as a keyboard and a pointing device. Other input devices (not shown) may include a microphone, joystick, game pad, satellite dish, scanner, touch screen and/or touch pad, voice recognition system to receive voice input, gesture recognition system to receive gesture input, or the like. These and other input devices are often connected to processor 1002 through a serial port interface that is coupled to the bus, but may also be connected by other interfaces, such as a parallel port, game port, or a universal serial bus (USB).

A display 1008 is also connected to the bus via an interface, such as a video adapter. Display 1008 may be external to or incorporated in computing device 1000. Display 1008 may display information, as well as being a user interface for receiving user commands and/or other information (e.g., by touch, finger gestures, virtual keyboard, etc.). In addition to display 1008, computing device 1000 may include other peripheral output devices (not shown) such as speakers and printers.

Computing device 1000 is connected to a network 1012 (e.g., the Internet) through an adaptor or network interface, a modem, or other means for establishing communications over the network.

CONCLUSION

While various embodiments of the disclosed subject matter have been described above, it should be understood that they have been presented by way of example only, and not limitation. Various modifications and variations are possible without departing from the spirit and scope of the described embodiments. Accordingly, the breadth and scope of the disclosed subject matter should not be limited by any of the above-described exemplary embodiments.

What is claimed is:

1. A system, comprising:
 a lasing cavity comprising a fiber under test and a feedback fiber; and
 a pulse pump generator transmitting a pump beam through the lasing cavity thereby generating stimulated Brillouin scattering traveling in a direction opposite to a direction of the pump beam, the pump beam exciting a plurality of lasing modes in the lasing cavity, the pump beam being pulsed at a repetition rate matching a round-trip time in the lasing cavity so that the stimulated Brillouin scattering amplifies plurality of lasing modes at discrete locations in the fiber under test.

2. The system of claim 1, wherein each lasing mode of the plurality of lasing modes comprises a lasing frequency, the lasing frequency of the each lasing mode corresponding to a Brillouin resonance frequency at the discrete locations,
wherein the fiber under test comprises a parameter of interest,
wherein a change in the parameter of interest produces a Brillouin frequency shift at one of the discrete locations in the fiber under test,
wherein the system further comprises:
a lasing frequency determiner determining the lasing frequency; and
a processing unit cooperating with the lasing frequency determiner inferring the Brillouin resonance frequency in the fiber under test based on the lasing frequency and determining the change in the parameter of interest based on the Brillouin frequency shift.

3. The system of claim 1, wherein the lasing frequency determiner comprises:
a photodetector cooperating with the lasing cavity; and
a local oscillator cooperating with the photodetector and the processing unit.

4. The system of claim 1, further comprising:
an electro-optic modulator cooperating with the pulse pump generator and the lasing cavity, the electro-optic modulator being driven by the pump beam so as to mitigate mode competition.

5. The system of claim 1, further comprising:
a polarization switch cooperating with the pulse pump generator so as to-mitigate polarization fading.

6. The system of claim 1, wherein the lasing cavity comprises a ring cavity or a Fabry-Pérot laser cavity.

7. The system of claim 1, wherein the feedback fiber is approximately equal to or longer than the fiber under test.

8. The system of claim 1, wherein the fiber under test and the feedback fiber comprises single mode fiber.

9. A method, comprising:
providing a lasing cavity comprising a fiber under test and a feedback fiber; and
transmitting a pump beam through the lasing cavity using a pulse pump generator thereby generating stimulated Brillouin scattering traveling in a direction opposite to a direction of the pump beam, the pump beam exciting a plurality of lasing modes in the lasing cavity, the pump beam being pulsed at a repetition rate matching a round-trip time in the lasing cavity so that the stimulated Brillouin scattering amplifies plurality of lasing modes at discrete locations in the fiber under test.

10. The method of claim 9, wherein the fiber under test comprises a parameter of interest,
wherein a change in the parameter of interest produces a Brillouin frequency shift at one of the discrete locations in the fiber under test,
wherein the method further comprises:
determining the in the parameter of interest based on the Brillouin frequency shift, using a processing unit.

11. The method of claim 10, wherein each lasing mode of the plurality of lasing modes comprises a lasing frequency, the lasing frequency of each lasing mode corresponding to a Brillouin resonance frequency at the discrete locations,
wherein the method further comprises:
providing a lasing frequency determiner cooperating with the processing unit; and
inferring the Brillouin resonance frequency in the fiber under test based on the lasing frequency, using the processing unit and the lasing frequency determiner.

12. The method of claim 9, further comprising:
mitigating mode competition with a pulse train with variable amplitude to adjust a round-trip loss experienced by each of the lasing modes, using an electro-optic modulator cooperating with the pulse pump generator and the lasing cavity.

13. The method of claim 9, further comprising:
mitigating polarization fading with sequential pump sequences with orthogonal polarizations, using a polarization switch cooperating with the pulse pump generator.

14. The method of claim 9, wherein the lasing cavity comprises at least one of a ring cavity or a Fabry-Pérot laser cavity.

15. The method of claim 14, wherein the ring cavity comprises the fiber under test and the feedback fiber that is approximately equal to or longer than the fiber under test.

16. The method of claim 9, wherein the fiber under test and the feedback fiber comprises single mode fiber.

* * * * *